United States Patent
Harris et al.

(10) Patent No.: US 7,182,009 B2
(45) Date of Patent: *Feb. 27, 2007

(54) ADJUSTABLE SHUTTLE STOP APPARATUS

(75) Inventors: Gerald R. Harris, Pryor, OK (US);
Timothy M. Neall, Pryor, OK (US)

(73) Assignee: HEM, Inc., Pryor, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/765,444

(22) Filed: Jan. 27, 2004

(65) Prior Publication Data

US 2004/0182212 A1  Sep. 23, 2004

Related U.S. Application Data

(62) Division of application No. 09/885,176, filed on Jun. 21, 2001, now Pat. No. 6,698,159.

(51) Int. Cl.
    B26D 5/20    (2006.01)
(52) U.S. Cl. .............................. 83/206; 83/263; 83/268
(58) Field of Classification Search .................. 83/263, 83/268, 247, 788–820, 206, 209, 409, 416, 83/419; 269/56, 58, 65
See application file for complete search history.

(56) References Cited

U.S. PATENT DOCUMENTS

| 3,474,693 | A |   | 10/1969 | Wilkie et al. |   |
| 3,552,254 | A |   | 1/1971  | Marczy |   |
| 3,718,061 | A |   | 2/1973  | Wilkin |   |
| 3,811,353 | A |   | 5/1974  | Miles |   |
| 3,910,142 | A |   | 10/1975 | Jureit et al. |   |
| 3,941,019 | A |   | 3/1976  | Baldwin et al. |   |
| 4,080,858 | A |   | 3/1978  | Stolzer |   |
| 4,117,756 | A |   | 10/1978 | Harris |   |
| 4,175,458 | A |   | 11/1979 | Paris, Jr. et al. |   |
| 4,179,961 | A |   | 12/1979 | Harris |   |
| 4,364,311 | A |   | 12/1982 | Platt, III |   |
| 4,463,845 | A |   | 8/1984  | Harris |   |
| 4,672,871 | A |   | 6/1987  | Gudmestad |   |
| 4,766,790 | A |   | 8/1988  | Harris |   |
| 4,823,662 | A | * | 4/1989  | Stolzer | 83/150 |
| 4,866,630 | A | * | 9/1989  | Beaman et al. | 700/160 |
| 4,893,533 | A |   | 1/1990  | Harris |   |
| 4,901,612 | A |   | 2/1990  | Harris |   |
| 5,163,663 | A |   | 11/1992 | Harris |   |
| 5,172,618 | A | * | 12/1992 | Moriya et al. | 83/13 |
| 5,299,480 | A |   | 4/1994  | Harris et al. |   |

(Continued)

Primary Examiner—Boyer D. Ashley
Assistant Examiner—Omar Flores Sánchez
(74) Attorney, Agent, or Firm—McAfee & Taft

(57) ABSTRACT

A adjustable shuttle stop apparatus for use in controlling feeding of material to a machining operation on a machine tool, such as a band saw. The apparatus comprises a feed conveyor, a band saw adjacent to the feed conveyor, a shuttle vise movably disposed on the feed conveyor, and an adjustable stop on the feed conveyor for adjusting a distance between the stop and the shuttle vise and for stopping the shuttle vise at the cutting position. The adjustable stop compensates for undesired movement of the shuttle vise caused by clamping the workpiece such that the distance between the stop and the shuttle vise remains substantially constant. This allows for a consistent cut length of the workpiece on subsequent cutting cycles. Different embodiments of the adjustable stop are disclosed along with a method of use of the apparatus.

12 Claims, 7 Drawing Sheets

U.S. PATENT DOCUMENTS

| | | |
|---|---|---|
| 5,353,910 A | 10/1994 | Harris et al. |
| 5,636,127 A * | 6/1997 | Aoki et al. ............... 700/167 |
| 6,145,424 A | 11/2000 | Matsuda et al. |
| 6,212,437 B1 | 4/2001 | Harris |
| 6,216,574 B1 | 4/2001 | Hain |
| 6,308,604 B2 | 10/2001 | Guzowski |

* cited by examiner

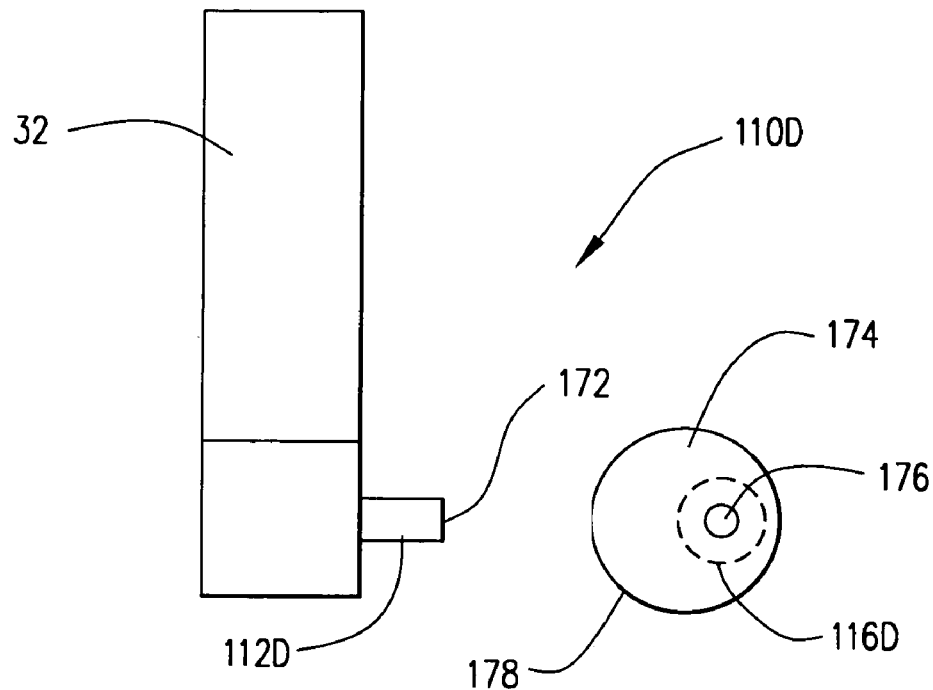
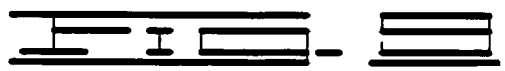
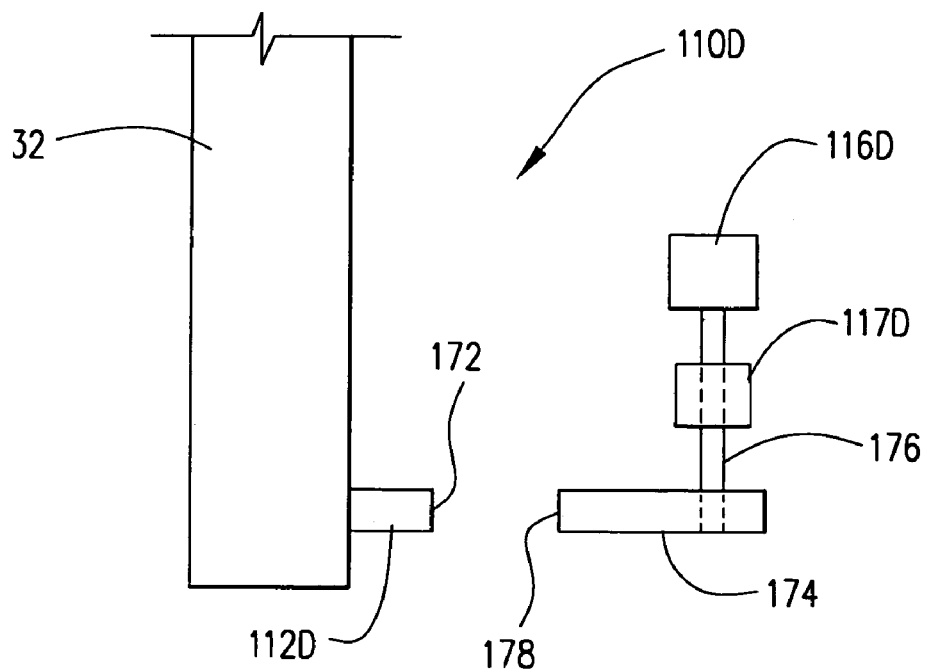

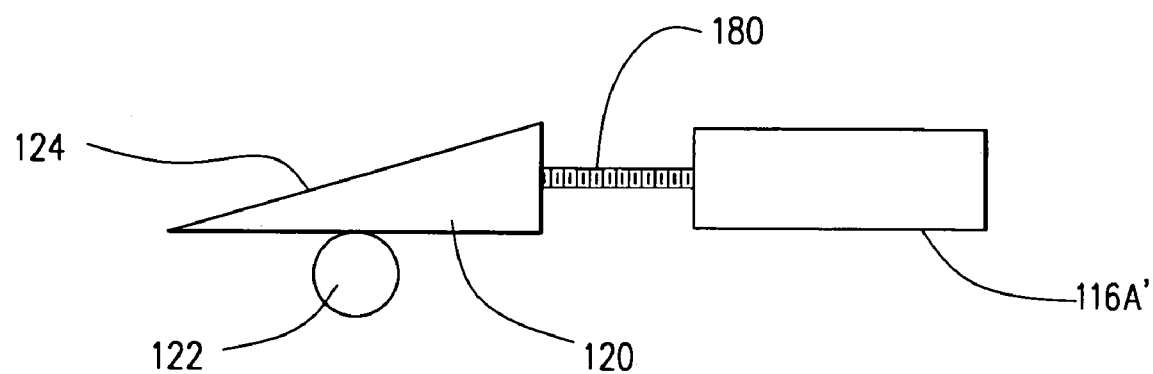
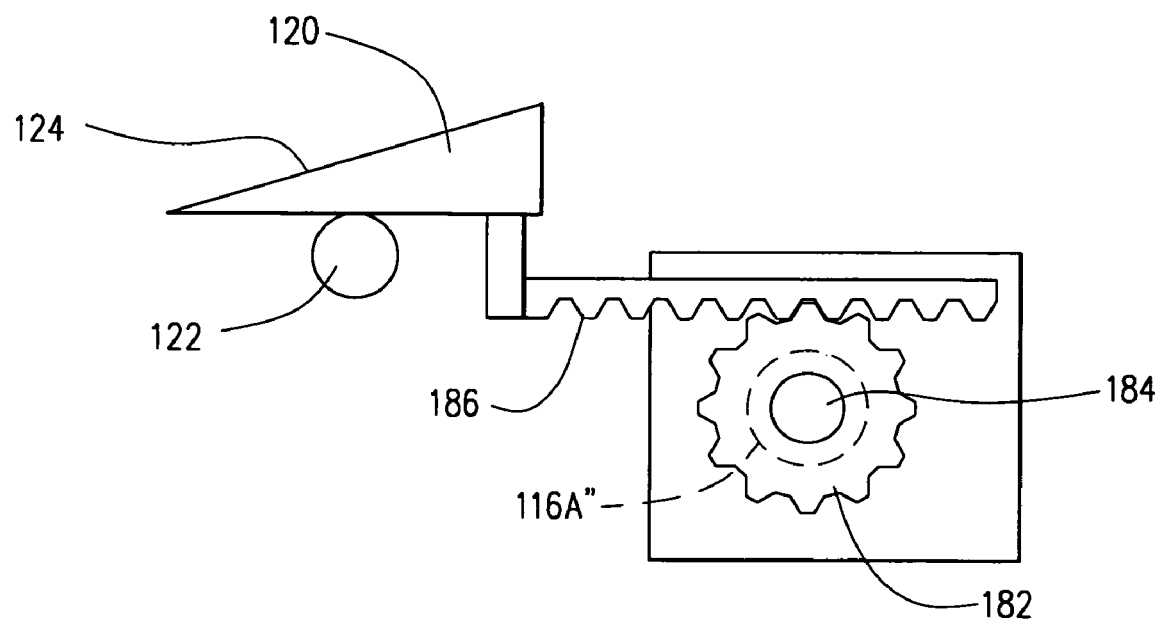

ADJUSTABLE SHUTTLE STOP APPARATUS

This a divisional of application Ser. No. 09/885,176, filed Jun. 21, 2001 now U.S Pat. No. 6,698,159.

BACKGROUND OF THE INVENTION

1. Field of the Invention

This invention relates to stops used in controlling the feeding of material as a workpiece to a machining operation, such as cutting a length of the material on a band saw, and more particularly, to an adjustable stop which compensates for undesired movement of the workpiece. The stop is illustrated in conjunction with a shuttle vise on a band saw, but the stop may be used in other applications, such as the feeding of material to a punch press, etc.

2. Description of the Prior Art

Machines for cutting material, such as large band saws which are used to cut workpieces formed of elongated materials, are well known in the art. The workpiece material is positioned on a feed conveyor adjacent to the saw blade and moved into a cutting position under the saw blade by a shuttle vise which is moved to a clamping position to initially clamp the material and then move in a direction toward the saw blade and to a cutting position. A stop is sometimes used to limit movement of the shuttle vise and to insure it stops at the desired cutting position. As the material is moved, it extends beyond the saw blade onto a receiving conveyor where it is clamped by a fixed vise adjacent to the saw blade. At this point, the material is cut by the saw blade. While the saw blade is cutting, the shuttle vise is released from the material and moved back to the desired clamping position to clamp the material again and move it to the cutting position for the next cutting operation. This type of saw works well for many applications where the cut length of the material is not particularly critical.

However, in cases where the cut length of the material may be critical this prior art saw may not be able to position the material in the cutting position accurately enough to insure that the cut length is within the desired tolerances. Closer tolerance requirements are becoming more common. The problem has to do with the straightness of the material, surface imperfections, and/or flexibility of the material and the deflection thereof when clamped by the shuttle vise. When the vise clamps the material, the clamping action may actually cause the shuttle vise to move slightly due to these variations in the material. This means that the shuttle vise is moved away from or toward the stop with the result that the cut length of the material may be correspondingly longer or shorter than desired. Obviously, if the movement of the shuttle vise can be greater than the cut length tolerances on the workpiece, this is very undesirable.

The present invention solves this problem by providing an adjustable stop to compensate for the amount of undesired movement of the shuttle vise and transmitting a signal to a controller which adjusts the position of the stop. Thus, when the shuttle vise moves to the cutting position and engages the adjusted stop, the cut length of the material will be at the proper length. That is, the adjustment of the stop compensates for the undesired movement of the shuttle vise so that the cut length of the material stays within the desired tolerances. Also, the encoder will detect the incorrect position of the shuttle vise and will adjust the front stop to compensate for the positional error in the shuttle vise. In addition to this positional adjustment, when the shuttle vise clamps the material to be cut, the encoder will detect variances which occur while clamping and will make an adjustment for that error also.

It will be understood by those skilled in the art, that this adjustable stop apparatus is useful in any application in which material is clamped and moved. Accordingly, the invention is not intended to be limited to a band saw application.

SUMMARY OF THE INVENTION

The present invention may be described as a material cutting apparatus comprising a feed conveyor, a band saw adjacent to the feed conveyor, a shuttle vise movably disposed on the feed conveyor and an adjustable stop on the feed conveyor for adjusting a distance between the stop and the shuttle vise. The shuttle vise is adapted for clamping a workpiece on the feed conveyor when in a clamping position and moving the workpiece to a cutting position adjacent to the band saw. The stop is also adapted for stopping the shuttle vise at the cutting position. Preferably, the stop is adapted for adjusting the distance between the stop and shuttle vise in an amount equal to movement of the shuttle vise caused by clamping the workpiece or errors in the initial positioning.

The apparatus may further comprise an encoder adapted for generating a signal in response to the movement of the shuttle vise and an actuator for moving the adjustable stop in response to the signal. The apparatus may further comprise a controller for receiving the signal and transmitting this signal to the actuator.

The apparatus may additionally comprise a positional sensor for sensing a position of the adjustable stop and transmitting a positional signal in response thereto to the controller. The positional sensor may a transducer, switch or other type of sensor.

In one embodiment, the adjustable stop comprises a wedge having an angled face opposite the shuttle vise and an actuator for moving the wedge transversely with respect to the feed conveyor. The actuator is characterized by any linear motion device, such as a pneumatic or hydraulic cylinder. In this first embodiment, the apparatus may further comprise a bumper disposed on the shuttle vise. The bumper has an angled face corresponding to the angled face on the wedge, and movement of the wedge results in varying the distance between the face on the bumper and the face on the wedge.

In a second embodiment, the adjustable stop comprises a stepped member having a plurality of faces directed toward the shuttle vise and an actuator for moving the stepped member transversely with respect to the feed conveyor. The actuator may be the same or similar to that described for the first embodiment. In the second embodiment, the apparatus may further comprise a bumper attached to the vise and having a face thereon. The actuator is adapted for moving the stepped member such that a selected one of the plurality of faces is aligned with the face on the bumper.

In a third embodiment, the adjustable stop comprises a sleeve, a shaft threadingly connected to the sleeve, and a prime mover for rotating the shaft. The shaft has an end with a face thereon directed toward the shuttle vise. Rotation of the shaft varies the distance between the face and the shuttle vise. The third embodiment may further comprise a bumper attached to the shuttle vise and adapted for engaging the face on the end of the shaft. The prime mover may be directly connected to the shaft or may be connected to the shaft by a drive train such as a first pulley connected to the shaft, a second pulley connected to the prime mover, and a belt interconnecting the first and second pulleys. It will be understood that the adjustable stop mechanism could be mounted on the shuttle vise and the fixed bumper attached to the saw frame.

Preferably, in the third embodiment, the apparatus further comprises a spring engaging the shaft and biasing the shaft longitudinally with respect to the sleeve for eliminating play in the threaded connection between the shaft and sleeve. The third embodiment may also comprise a switch and a cam rotatable by the prime mover and having a cam lobe thereon for engaging the switch when the cam is in a predetermined position. This predetermined position preferably corresponds to a longitudinal mid-point of the shaft. The switch is connected to the controller for the shuttle vise so the system can be reset with the location of the shaft known.

In a fourth embodiment, the adjustable stop comprises an eccentric cam and a prime mover for rotating the cam. Rotation of the cam varies the distance between the cam surface and the shuttle vise. A bumper may be attached to the shuttle vise and adapted for engaging the cam surface. The prime mover may be directly connected to the cam, such as by a shaft, or may be connected to the cam by a drive train, such as a belt-and-pulley assembly.

The present invention may also be described as a method of cutting a workpiece comprising the step of (a) providing a material cutting apparatus comprising a feed conveyor, a band saw adjacent to the feed conveyor, a shuttle vise movably disposed on the feed conveyor, an adapter for clamping a workpiece on the feed conveyor when in a clamping position and moving the workpiece to a cutting position adjacent to the band saw, and a stop on the feed conveyor for stopping the shuttle vise at the cutting position. The method further comprises the steps of (b) detecting movement of the shuttle vise resulting from clamping the workpiece and (c) adjusting the stop on the feed conveyor for compensating for the movement of the shuttle vise such that a distance between the shuttle vise and the stop remains substantially constant. Step (c) may also comprise adjusting the stop for compensating for initial inaccurate positioning of the shuttle vise.

Step (c) may comprise generating a signal in response to the movement of the shuttle device and transmitting the signal to an actuator for moving the adjustable stop in response to the signal.

In one embodiment, step (c) comprises moving a wedge on the stop transversely with respect to the feed conveyor. In another embodiment, step (c) comprises moving a stepped member having a plurality of faces thereon transversely with respect to the feed conveyor. In still another embodiment, step (c) comprises rotating a shaft connected to the stop. In an additional embodiment, step (c) comprises rotating an eccentric cam to vary the distance between a cam surface on the cam and the shuttle vise.

Numerous objects and advantages of the invention will become apparent as the following detailed description of the preferred embodiments is read in conjunction with the drawings which illustrate such embodiments.

BRIEF DESCRIPTION OF THE DRAWINGS

FIG. 9 illustrates a fourth embodiment of the adjustable stop.

FIG. 10 is a plan view of the fourth embodiment.

FIG. 11 shows a variation of the first embodiment.

FIG. 12 illustrates another variation of the first embodiment.

DESCRIPTION OF THE PREFERRED EMBODIMENTS

Figure 1:
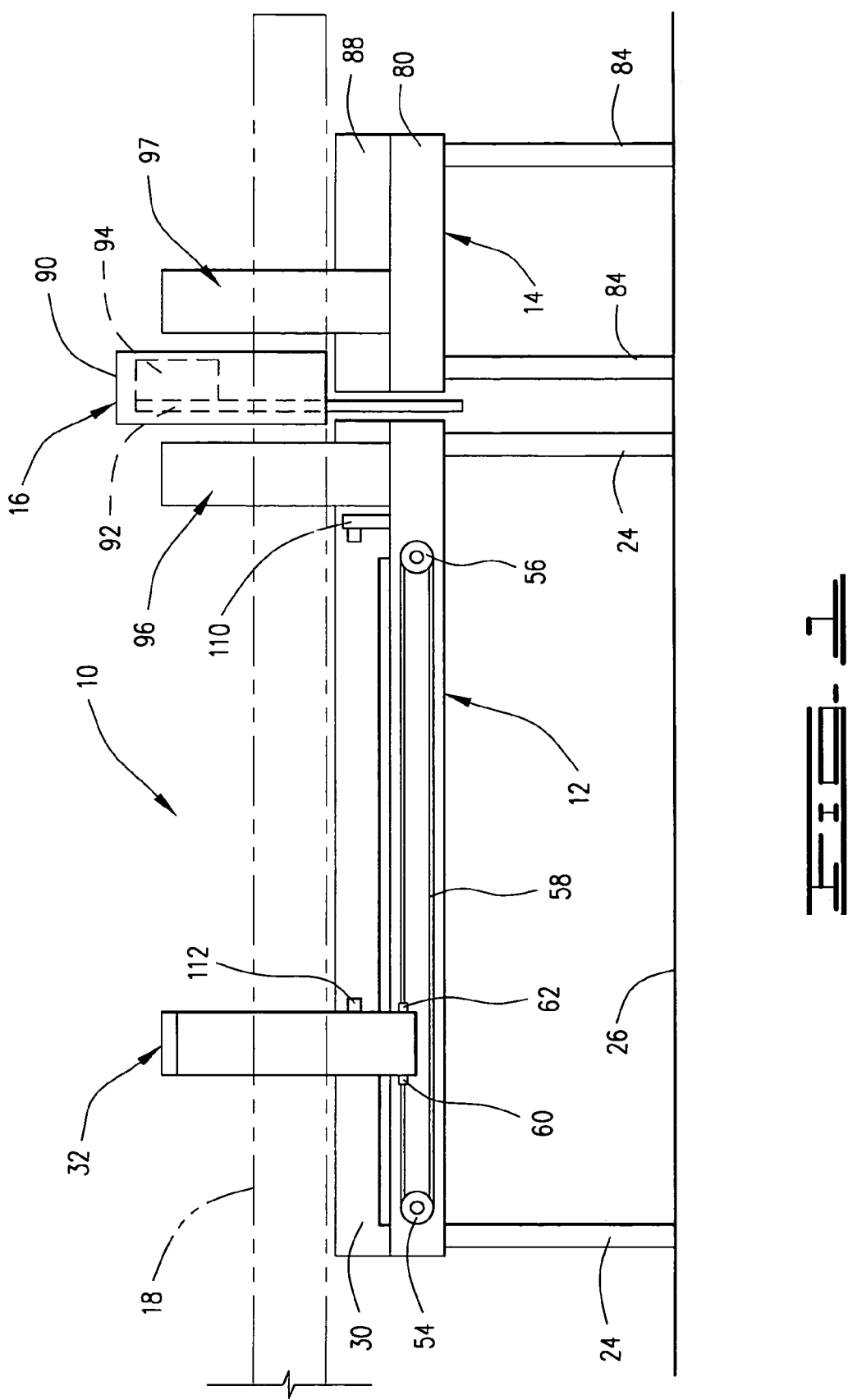
FIG. 1 shows a side view of the band saw apparatus with adjustable shuttle stop of the present invention.
Figure 2:
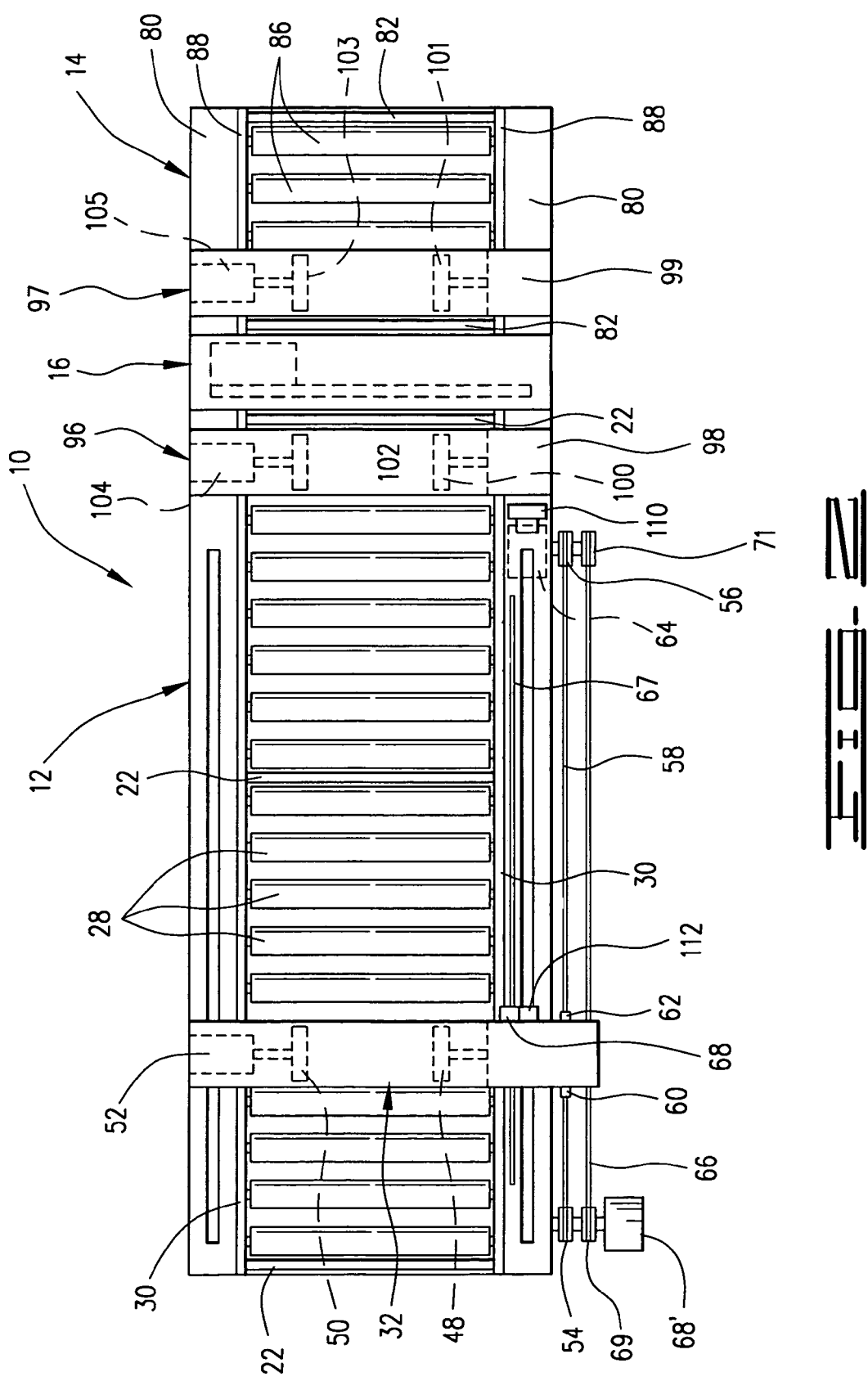
FIG. 2 is a plan view of the apparatus.
Figure 3:
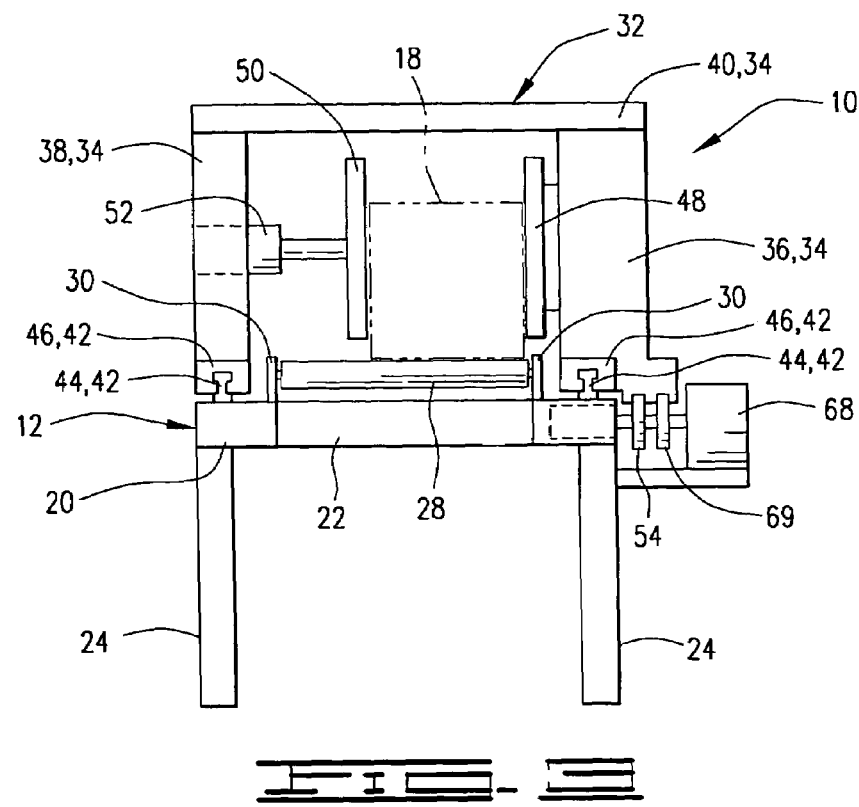
FIG. 3 is an end view as seen from the feed side of the apparatus.

Referring now to the drawings and more particularly to FIGS. 1–3, the band saw apparatus with adjustable shuttle stop of the present invention is shown and generally designated by the numeral 10. Apparatus 10 comprises a horizontally disposed feed conveyor 12 and a horizontally disposed receiving conveyor 14. A band saw 16 is disposed between feed conveyor 12 and receiving conveyor 14 and is adapted for cutting workpiece 18 formed of elongated material. Workpiece 18 includes a single piece or multiple pieces bundled and/or stacked together. Band saw 16 will normally be connected to receiving conveyor 14.

Feed conveyor 12 generally comprises a pair of side rail supports 20 interconnected by a plurality of cross members 22. Side rail supports 20 are supported on a plurality of legs 24 above a ground surface 26.

Feed conveyor 12 also has a plurality of longitudinally spaced, transversely extending rollers 28 rotatably mounted on a pair of longitudinally extending roller supports 30. Roller supports 30 are attached to, or integral with, side rail supports 20.

A shuttle vise 32 is mounted on feed conveyor 12 and may be moved longitudinally therealong as will be hereinafter described.

As best seen in FIG. 3, shuttle vise 32 comprises an outer housing 34 formed by a pair of upright members 36 and 38 interconnected by a horizontal member 40. Upright members 36 and 38 are slidably mounted on side rail supports 20 of feed conveyor 12 by a pair of linear guide rail bearings 42. Each linear bearing 42 includes a rail 44 and a rail bushing 46 movably disposed on the rails. Linear bearings 42 are of a kind known in the art and provide substantially free longitudinal movement of shuttle vise 32 with respect to feed conveyor 12 with relatively little friction. Linear bearings 42 also are designed to resist both horizontal and vertical forces applied by rail bushings 46 on rails 44. Thus, linear bearings 42 provide a guide for longitudinal movement of shuttle vise 32 and support to resist forces applied to the shuttle vise.

In the illustrated embodiment, shuttle vise 32 also comprises a stationary vise plate 48 attached to upright member 36 and a movable vise plate 50 attached to upright member 38 by a vise actuator 52. Vise actuator 52 may be of any kind known in the art, such as a hydraulic or pneumatic cylinder or other device capable of providing the desired motion. By energizing actuator 52 in a manner known in the art, movable vise plate 50 may be moved in a transverse direction toward or away from stationary vise plate 48. Alternatively, vise plate 48 may also be movable by an actuator (not shown) similar to actuator 52. It is not intended that the invention be limited only to a shuttle vise having a movable plate and a stationary plate. Movable vise plate 50 is adapted to engage workpiece 18 and clamp it against stationary vise plate 48 in a manner hereinafter described.

A drive mechanism is utilized to move shuttle vise 32 along rails 44 of linear bearings 42. In the illustrated embodiment, this drive mechanism comprises a driven sprocket 54 mounted at one end of feed conveyor 12, a drive sprocket 56 mounted at an opposite end of feed conveyor 12, and a chain 58 wrapped around, and engaged with, the sprockets. As best seen in FIG. 1, chain 58 is connected to one side of shuttle vise 32 at an attachment point 60, and the other end of the chain is attached to the shuttle vise at another attachment point 62 on the opposite side of the shuttle vise. It will be seen by those skilled in the art that rotation of drive sprocket 56 in a clockwise direction as seen in FIG. 1 will result in a corresponding movement of chain 58 around sprockets 54 and 56 which causes shuttle vise 32 to move to the right toward band saw 16. Similarly, counterclockwise rotation of driven sprocket 54 will cause the shuttle vise to move away from the band saw. Drive sprocket 56 is actuated by a prime mover 64 of a kind known in the art, such as a reversible electric motor, a servomotor, a hydraulic motor, etc.

Other drive mechanisms could also be used. For example, shuttle vise 32 could be driven using a rack and pinion system, a hydraulic or pneumatic cylinder, a rotating screw device, etc.

An encoder strip 67 is attached to one of side rail supports 20 of feed conveyor 12 adjacent to one of rails 44, as seen in FIG. 2. An encoder reader 68 is attached to shuttle vise 32 and adapted to read encoder strip 67 as the shuttle vise is moved along feed conveyor 12. As will be further described herein, encoder reader 68 generates an encoder signal in response to the movement.

Figure 4:
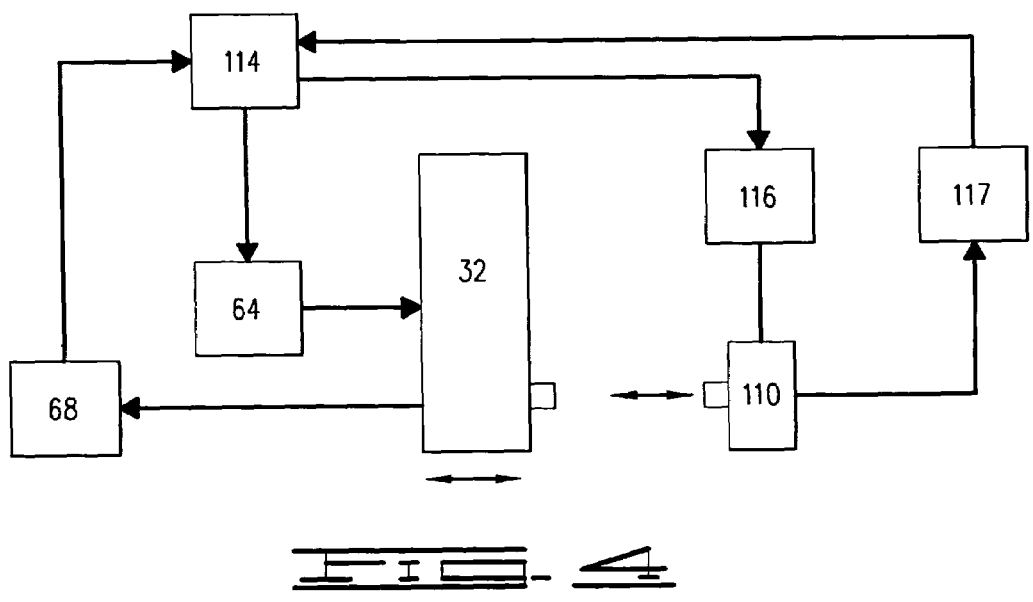
FIG. 4 shows a schematic of the control circuit for the adjustable stop used in the apparatus.

In an alternate embodiment, also shown in FIG. 2 as well as FIGS. 1 and 4, a belt 66 is attached to shuttle vise 32, and the belt engages belt pulleys 69 and 71. An encoder 68' is used to measure the rotation of belt pulley 69 corresponding to the movement of belt 66, and thus of shuttle vise 32. As will be further described herein in this embodiment, encoder 68' generates an encoder signal in response to the movement.

Alternatively, other methods of measuring the movement of shuttle vise 32 may be used. For example, measurement could be by use of a laser, using an encoder to measure rotation of a pinion gear on a rack attached to the shuttle vise, etc.

Receiving conveyor 14 comprises a pair of side supports 80 interconnected by cross members 82. Side supports 80 are supported on ground surface 26 by a plurality of legs 84.

Receiving conveyor 14 also includes a plurality of longitudinally spaced transverse rollers 86 rotatably mounted on a pair of longitudinally extending roller supports 88. Roller supports 88 are attached to, or integral with, the corresponding cross members 82.

Band saw 16 comprises an outer housing 90 which contains a rotating band saw blade 92 and band saw driver 94 therein. Band saw driver 94 is of a kind known in the art, such as an electric motor. Band saw portion 16 is mounted such that band saw blade 92 may be moved downwardly so that it cuts through workpiece 18 when the workpiece is at the cutting position thereof. Again, the invention is not intended to be limited to the particular band saw embodiment shown.

A fixed vise 96 is positioned adjacent to the inlet side of band saw 16 and is of construction similar to shuttle vise 32 except that the fixed vise does not move. Fixed vise 96 has an outer housing 98 with a stationary vise plate 100 attached to the housing and a movable vise plate 102 connected to the housing by a vise actuator 104. Vise actuator 104 is similar to previously described vise actuator 52 and, when energized, may be used to position movable vise plate 102 toward and away from stationary vise plate 100. Alternately, two movable vise plates could be utilized.

Similarly, another fixed vise 97 may be located adjacent to the discharge side of band saw 16. Fixed vise 97 has an outer housing 99 with a stationary vise plate 101 attached to the housing and a movable vise plate 103 connected to the housing by a vise actuator 105. Vise actuator 105 is similar to previously described vise actuator 104 and, when energized, may be used to position movable vise plate 103 toward and away from stationary vise plate 101. Optionally, two moveable vise plates could be used.

Apparatus 10 as previously described is of a kind generally known in the art, such as that disclosed in U.S. Pat. No. 5,353,910, a copy of which is incorporated herein by reference.

Apparatus 10 further comprises an adjustable stop 110 for limiting the movement of shuttle vise 32 toward band saw 16 when moving workpiece 18 to the cutting position. Shuttle vise 32 stops moving toward band saw portion 16 when bumper 112 on the shuttle vise engages adjustable stop 110.

Referring now to FIG. 4, a control circuit for adjustable stop 110 and shuttle vise 32 is shown. Shuttle vise 32 is driven as previously described by prime mover 64. The movement of shuttle vise 32, and the corresponding movement of encoder strip 66, results in encoder 68 precisely locating the position of shuttle vise 32 and sending a signal in response to that position to a controller 114. Controller 114 sends a signal to a stop actuator 116 which controls movement of adjustable stop 110 toward and away from shuttle vise 32.

As will be further described herein, adjusting stop 110 to compensate for errors in positioning and/or movement caused by clamping, speeds up positioning time for shuttle vise 32. Adjustable stop 110 makes fine adjustments easier than the more coarse general positioning of shuttle vise 32 as well as providing adjustment after clamping workpiece 18.

In operation, workpiece 18 is positioned on feed conveyor 12 such that it may be engaged by shuttle vise 32. As previously stated, workpiece 18 may include a plurality of elongated items, such as pieces of steel bar stock. Shuttle vise 32 moves away from band saw 16 until it reaches the desired clamping position which is predetermined, based upon the desired cut length of workpiece 18. Vise actuator 52 is energized so that movable vise plate 50 is moved toward stationary vise plate 48 to clampingly engage workpiece 18 between the vise plates. As previously mentioned, the action of clamping workpiece 18 may cause shuttle vise 32 to move somewhat from its original, predetermined clamping position. Because the material of workpiece 18 may not be straight, may have surface imperfections, or may compress or flex during clamping, the reaction forces thus applied to shuttle vise 32, and the tolerances of all of the components, can result in the shuttle vise moving from the optimum position thereof.

After clamping, shuttle vise 32 is moved toward band saw 16 until it engages stop 110 at the cutting position. If stop 110 is fixed, any movement of shuttle vise 32 caused by the clamping on workpiece 18 will result in the overall movement of the shuttle vise to be something other than what is desired. This is a particular problem, if the undesired movement of shuttle vise 32 during the clamping operation results in a change which is outside the tolerance of the cut length of workpiece 18. That is, if shuttle vise 32 is moved away from band saw 16 and away from a fixed stop, the cut length of the material will be greater than desired. Similarly, if shuttle vise 32 is moved toward band saw portion 16 during clamping, the resulting movement toward a fixed stop would cause the workpiece to be cut shorter than desired.

Because of the nature of the materials clamped, it is virtually impossible to prevent this type of movement of shuttle vise 32.

Adjustable stop 110 eliminates this problem. When shuttle vise 32 is moved to its clamping position in a direction away from band saw portion 16, this movement is measured by encoder 68. After clamping, the additional movement of shuttle vise 32 is also detected by encoder 68. Encoder 68 sends a signal to controller 114 which in turn energizes stop actuator 116 to move adjustable stop 110 to a distance equal to, and in the same direction as, the movement of shuttle vise 32 during clamping. That is, if the clamping causes shuttle vise 32 to be moved back from its desired position by 0.060 inches, stop actuator 116 will move adjustable stop 110 away from band saw 16 and toward shuttle vise 32 by the same distance. Thus, when shuttle 32 is then moved from the clamping position to the cutting position, it will move the original, predetermined distance. Thus, there has been compensation for the undesired movement during clamping. This compensation by adjustable stop 110 provides that the cut lengths of workpiece 18 are substantially the same for each cycle. In this way, much more precise cut length tolerances can be met using apparatus 10 than with previously known band saws.

Also, controller 114 receives a positional signal from a positional sensor 117 in response to the current position of stop actuator 116 and/or adjustable stop 110. Sensor 117 may be a transducer or other sensor if a kind known in the art. It can even be a switch triggered by movement of adjustable stop 110. Sensor 117 and the positional signal therefrom are used to control movement of shuttle vise 32 in order to maximize the available adjustable movement of adjustable stop 110. For example, if adjustable stop 110 were in an extended position, controller 114 would control the initial movement of shuttle vise 32 to stop the shuttle vise such that it requires adjustable stop 110 to retract for the correct length, and vice versa. Alternatively, adjustable stop 110 can automatically be reset to a mid-position whenever shuttle vise 32 is moved to its clamping position. The various embodiments discussed herein explain this further.

Referring now to FIGS. 5–10, specific embodiments of adjustable stop 110 are shown and generally designated by the numerals 110A, 110B, 110C and 110D. While four embodiments of adjustable stop 110 are shown, the invention is not intended to be limited only to these four.

Figure 5:
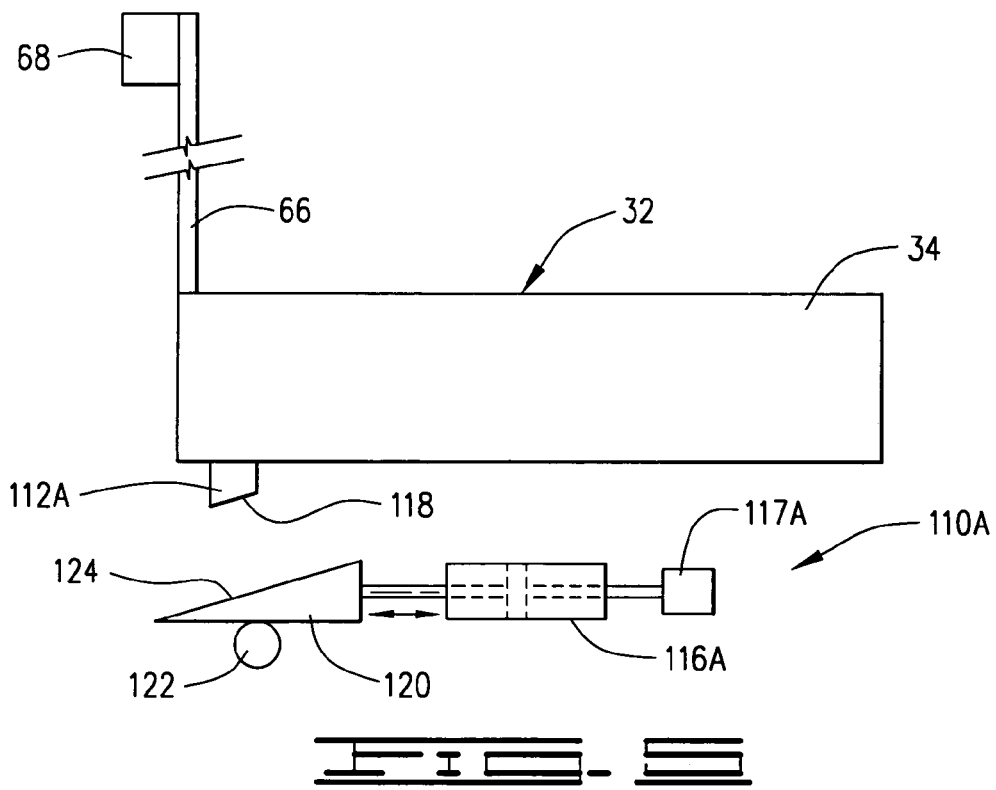
FIG. 5 schematically illustrates a first embodiment of the adjustable stop.

Referring now to FIG. 5, a first embodiment adjustable stop 110A is shown. In this embodiment, shuttle vise 32 has a first embodiment bumper 112A thereon. Bumper 112A has a face 118 which is angled from a transverse plane with respect to apparatus 10. Adjustable stop 110A comprises a wedge supported for transverse movement on a support 122. Wedge 120 is connected to a first embodiment stop actuator 116A. Stop actuator 116A is illustrated as a pressure-actuated hydraulic or pneumatic cylinder, but any other linear motion device providing linear movement of stop 110A would be acceptable, as will be further described herein.

Wedge 120 has a face 124 which is angled to correspond to face 118 on bumper 112A.

Undesired movement of shuttle vise 32 upon clamping is detected by encoder 68 which sends a signal to stop actuator 116A to move wedge 120 transversely with respect to feed conveyor 12 along support 122. By moving wedge 120 to the left as shown in FIG. 5, the point of contact on face 124 is moved closer to face 118, and conversely, moving wedge 120 to the right in FIG. 5 will move face 124 away from face 118. The amount of movement of stop actuator 116 is determined by controller 114 so that the distance between faces 124 and 118 is moved by the same amount, and in the same direction as, the undesired movement of shuttle vise 32 during clamping.

Sensor 117A sends a positional signal to controller 114 to control movement of shuttle vise 32 in order to maximize the available adjustable movement of adjustable stop 110A as previously described generally in the discussion of FIG. 4.

Figure 6:
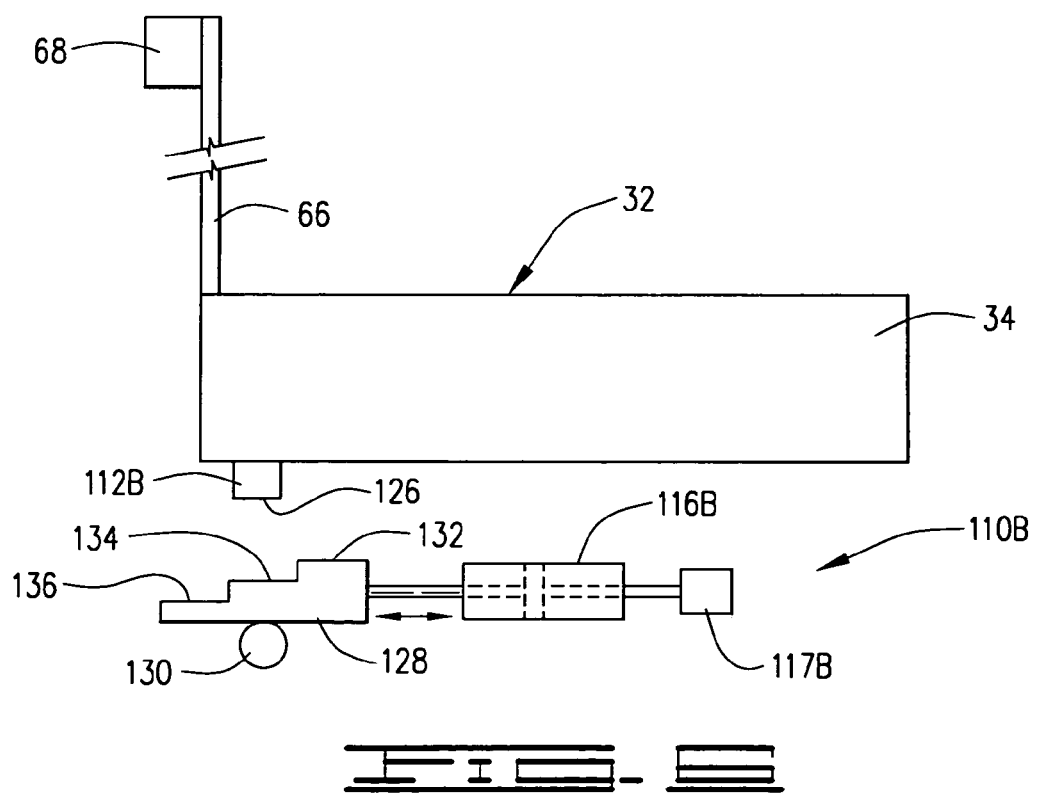
FIG. 6 is a schematic of a second embodiment of the adjustable stop.

FIG. 6 shows a second embodiment adjustable stop 110B which is somewhat similar to first embodiment 110A. In second embodiment 110B, shuttle vise 32 has a second embodiment bumper 112B having a transversely extending face 126 thereon. Adjustable stop 110B includes a stepped member 128 supported on a support 130 and actuated by a second embodiment stop actuator 116B. Stop actuator 116B is essentially the same as first embodiment stop actuator 116A and may comprise a hydraulic or pneumatic cylinder or other linear movement device.

Stepped member 128 has a plurality of stepped surfaces, such as 132, 134 and 136 thereon. While three such stepped surfaces are shown in FIG. 6, it will be understood by those skilled in the art that more or less stepped surfaces could be utilized depending on circumstances. When stop actuator 116B is actuated to locate face 132 opposite bumper 112B, the distance between faces 126 and 132 will be less than between faces 126 and 134. Additionally, the distance between faces 126 and 134 will be less than between faces 126 and 136. By energizing stop actuator 116B in response to a signal from controller 114, the desired face 132, 134 or 136 is positioned opposite face 126 to compensate for movement of shuttle vise 32 when clamping.

Sensor 117B sends a positional signal to controller 114 to control movement of shuttle vise 32 in order to maximize the available adjustable movement of adjustable stop 110B as previously described generally in the discussion of FIG. 4.

Figure 7:
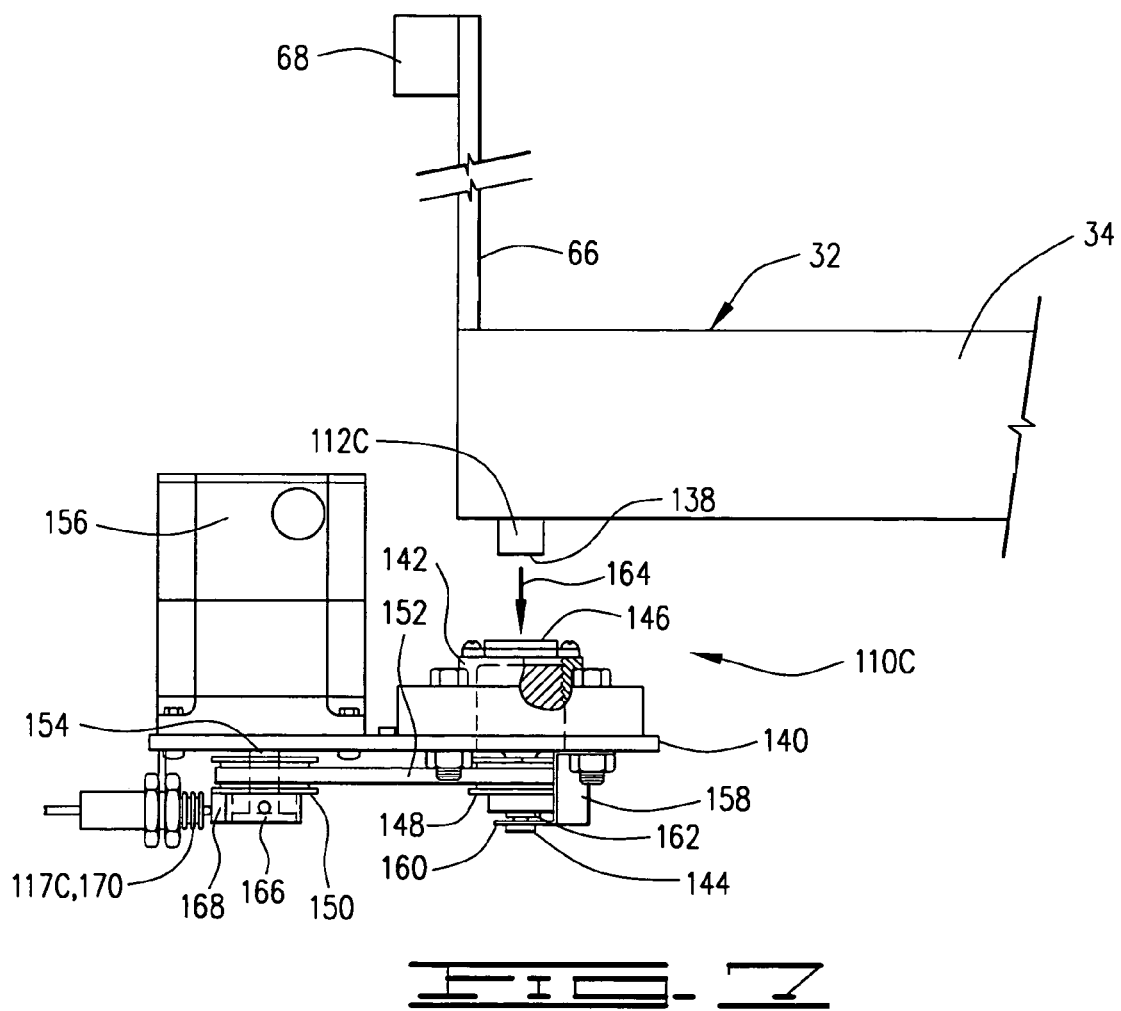
FIG. 7 shows a third embodiment of the adjustable stop.
Figure 8:
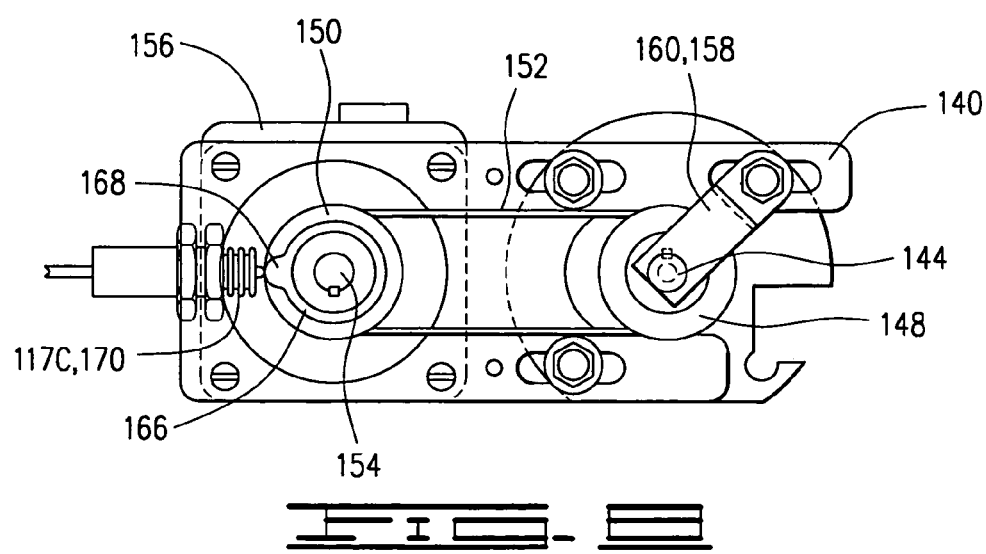
FIG. 8 is a view of the adjustable stop as seen from the bottom of FIG. 7.

Referring now to FIGS. 7 and 8, a third embodiment adjustable stop 110C is illustrated in which shuttle vise 32 has a bumper 112C thereon with a face 138 extending transversely. Third embodiment stop 110C comprises a mount 140 with an internally threaded sleeve 142, such as an Acme nut, attached thereto. Mount 140 may be attached to fixed object such as one of side rail supports 20 of feed conveyor 12 (not shown in FIGS. 7 and 8). A shaft 144 is threadingly engaged with sleeve 142 and has an end face 146 thereon generally opposite face 138 on bumper 112C. As illustrated, third embodiment stop actuator 116C comprises a pulley assembly with a pulley 148 which is connected to another pulley 150 by a drive belt 152. Pulley 150 is attached to a shaft 154 of a prime mover 156, also part of stop actuator 116C, and driven by shaft 154 in response to a signal from controller 114. Thus, when shuttle vise 32 moves undesirably during clamping, prime mover 156 is actuated in response to that movement. Prime mover 156 is of a type which is reversible, such as a reversible electric motor, a servomotor, hydraulic pump, etc. Actuation of prime mover 156 results in corresponding rotation of pulleys 150 and 148 through drive belt 152. This rotates shaft 144 within sleeve 142 which in turn causes longitudinal movement of shaft 144 and end face 146 toward or away from face 138. In this way, the distance between faces 138 and 144 may be adjusted to correspond with the clamping movement of shuttle vise 32. The total longitudinal movement of shaft 144 is on the order of about 0.1 inches which is not enough to cause any significant alignment problems of pulley 148 with respect to pulley 150.

A spring 158 is attached to mount 140 by any means know in the art. Spring 158 has a cantilevered spring arm 160 which engages a groove 162 in a distal end of shaft 144. Spring arm 160 is preloaded to always bias shaft 144 in a direction indicated by arrow 164 regardless of the longitudinal position of the shaft. This biasing of shaft 144 insures that any slack or "play" in the threaded engagement of the shaft with sleeve 142 is eliminated and therefore does not affect the longitudinal positioning of shaft 144.

A cam 166 is connected to shaft 154 of prime mover 156 on the outside of pulley 150. Cam 166 has a cam lobe 168 thereon adapted for engaging sensor 117C, such as a switch 170. Switch 170 is of a kind known the art and is connected to controller 114, but other types of sensors could be used. Preferably, cam lobe 168 engages switch 170, as seen in FIG. 8, when shaft 144 is approximately at its mid-point longitudinally. In this way, controller 114 can easily be reset and recalibrated when shaft 144 is not positioned too far in either longitudinal direction thereof. Thus, switch 170 acts as another embodiment of sensor 117 as generally illustrated in FIG. 4.

Alternatively, shaft 144 could be directly coupled to the shaft of a prime mover which may be any type of device which provides reversible rotational movement.

Finally, referring to FIGS. 9 and 10, a fourth embodiment adjustable stop 110D is shown in which shuttle vise 32 has a bumper 112D thereon with a face 172 extending transversely. Fourth embodiment stop 110D comprises an eccentric cam 174 driven by fourth embodiment stop actuator 116D through a shaft 176. Stop actuator 116D could also be connected to cam 174 by a belt-and-pulley assembly in a manner known in the art. Fourth embodiment stop actuator 116D is preferably a prime mover, such as a reversible step motor which allows rotation of cam 174 in either direction in variable increments, although other rotatable devices could also be used. Cam 174 has an outer cam surface 178 thereon which is adapted for contacting face 172 on bumper 112D. By rotation of cam 174, it will be seen by those skilled in the art that the distance between the center of shaft 176 and the point of contact of cam surface 178 with face 172 may be varied to adjust the position of shuttle vise 32.

Sensor 117D sends a positional signal to controller 114 related to the rotational position of shaft 176 and/or cam 174 to control movement of shuttle vise 32 in order to maximize the available adjustable movement of adjustable stop 110D as previously described generally in the discussion of FIG. 4.

Referring now to FIGS. 11 and 12, two variations of first embodiment adjustable stop 110A are shown. It will be seen by those skilled in the art that these variations may be incorporated in other embodiments in addition to the first embodiment.

In FIG. 11, a stop actuator 116A" is shown as a reversible step motor or the like connected to wedge 120 by a screw member which results in linear movement of the wedge as the motor is rotated.

In FIG. 12, linear motion of wedge 120 is provided by a rack and pinion gear system. A pinion gear 182 is connected to a stop actuator 116A" by a shaft 184. Pinion gear 182 engages a gear rack 186 which is connected to wedge 120. This, of course, results in linear movement of rack 186 and wedge 120 in response to rotation of pinion gear 182. Stop actuator 116A" is shown as a prime mover, such as a reversible step motor, but other rotatable devices could also be used.

It will be seen, therefore, that the band saw with adjustable shuttle stop of the present invention is well adapted to carry out the ends and advantages mentioned, as well as those inherent therein. While presently preferred embodiments of the apparatus have been shown for the purposes of this disclosure, numerous changes in the arrangement and construction of parts may be made by those skilled in the art. All such changes are encompassed within the scope and spirit of the appended claims.

What is claimed is:

1. A material cutting apparatus comprising:
   a feed conveyor;
   a machine tool adjacent to the feed conveyor;
   a shuttle vise movably disposed on the feed conveyor, the shuttle vise being adapted for clamping a workpiece on the feed conveyor when in a clamping position and moving the workpiece to a cutting position adjacent to the machine tool; and
   an adjustable stop on the feed conveyor for continuously adjusting a distance between the stop and the shuttle vise and stopping the shuttle vise at the cutting position, wherein the adjustable stop is adapted for adjusting the distance in an amount approximately equal to movement of the shuttle vise caused by clamping the workpiece, the adjustable stop comprising:
   a sleeve;
   a shaft having an end with a face thereon directed toward the shuttle vise, the shaft being threadedly connected to the sleeve such that rotation of the shaft varies the distance between the face and the shuttle vise; and
   a prime mover for rotating the shaft.

2. The apparatus of claim 1 further comprising:
   a bumper attached to the shuttle vise and adapted for engaging the face on the end of the shaft.

3. The apparatus of claim 1 further comprising:
   a first pulley connected to the shaft;
   a second pulley connected to the prime mover; and
   a belt interconnecting the first and second pulleys.

4. The apparatus of claim 1 further comprising a spring engaging the shaft and biasing the shaft longitudinally with respect to the sleeve for eliminating play in a threaded connection between the shaft and sleeve.

5. The apparatus of claim 1 further comprising:
   a switch; and
   a cam rotatable by the prime mover and having a cam lobe thereon for engaging the switch when the cam is in a predetermined position.

6. The apparatus of claim 5 wherein the predetermined position corresponds to a longitudinal mid-point position of the shaft.

7. In a material cutting apparatus of the type in which a feed conveyor feeds a workpiece to a material cutting device adjacent to the feed conveyor, and a shuttle vise is longitudinally movably disposed on the feed conveyor and adapted for clamping the workpiece when in a clamping position and moving the workpiece to a cutting position under the material cutting device, the improvement comprising:
   a stop disposed on the feed conveyor for limiting movement of the shuttle vise toward the material cutting device, the distance between the stop and the shuttle vise being continuously adjustable in response to movement of the shuttle vise when clamping the workpiece; and an actuator comprising:
  a sleeve;
  a shaft threadingly engaged with the sleeve and rotatable therein; and
  a prime mover for rotating the shaft;
wherein:
  the stop comprises an end of the shaft directed toward the shuttle vise; and
  rotation of the shaft continuously varies the distance between the end and the shuttle vise.

8. The improvement of claim 7 further comprising a bumper attached to the shuttle vise and adapted for engaging the end of the shaft.

9. The improvement of claim 7 wherein the actuator further comprises:
a first pulley connected to the shaft;
a second pulley connected to the prime mover; and
a belt interconnecting the first and second pulleys.

10. The improvement of claim 7 further comprising a spring engaging the shaft and biasing the shaft longitudinally with respect to the sleeve for eliminating play in a threaded connection between the shaft and sleeve.

11. The improvement of claim 7 further comprising:
a switch; and
a cam rotatable by the prime mover and having a cam lobe thereon for engaging the switch when the cam is in a predetermined position.

12. The improvement of claim 11 wherein, the predetermined position corresponds to a longitudinal mid-point position of the shaft.

* * * * *